(12) United States Patent
Miller

(10) Patent No.: US 10,688,597 B2
(45) Date of Patent: Jun. 23, 2020

(54) POLISHING OPTICAL ELEMENTS WITH A FEMTOSECOND LASER BEAM

(71) Applicant: Spy Eye, LLC, Los Gatos, CA (US)

(72) Inventor: Gregory David Miller, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 298 days.

(21) Appl. No.: 15/833,492

(22) Filed: Dec. 6, 2017

(65) Prior Publication Data

US 2018/0169791 A1 Jun. 21, 2018

Related U.S. Application Data

(60) Provisional application No. 62/435,038, filed on Dec. 15, 2016.

(51) Int. Cl.
| | | |
|---|---|---|
| *B23K 26/362* | (2014.01) | |
| *B23K 26/04* | (2014.01) | |
| *B23K 26/082* | (2014.01) | |
| *B23K 26/0622* | (2014.01) | |
| *B23K 26/352* | (2014.01) | |
| *G02C 7/04* | (2006.01) | |

(52) U.S. Cl.
CPC .......... *B23K 26/362* (2013.01); *B23K 26/048* (2013.01); *B23K 26/0624* (2015.10); *B23K 26/082* (2015.10); *B23K 26/3576* (2018.08); *G02C 7/04* (2013.01)

(58) Field of Classification Search
CPC . B23K 26/362; B23K 26/0624; B23K 26/082
See application file for complete search history.

(56) References Cited

U.S. PATENT DOCUMENTS

| | | | | |
|---|---|---|---|---|
| 5,580,498 A | * | 12/1996 | Sugiyama | ........ B29D 11/00903 264/1.7 |
| 8,002,608 B2 | * | 8/2011 | Kendig | ................... B29C 33/38 451/28 |
| 8,087,777 B2 | | 1/2012 | Rosenthal | |

(Continued)

OTHER PUBLICATIONS

Taylor et al., Femtosecond laser polishing of optical materials, Proceedings vol. 9633, Optifab 2015; 96330M (2015) (Year: 2015).*

(Continued)

*Primary Examiner* — Jacob T Minskey
*Assistant Examiner* — Melody Tsui
(74) *Attorney, Agent, or Firm* — Fenwick & West LLP

(57) ABSTRACT

A system uses a femtosecond laser beam to polish a surface of an optical element to optical smoothness. The system includes a fixture, a laser system, and a controller. The fixture holds the optical element. The laser system generates the femtosecond laser beam. The femtosecond laser beam includes converging laser pulses with a pulse duration less than 900 femtoseconds. The controller controls relative positioning of the surface of the optical element and the femtosecond laser beam so that a waist of the femtosecond laser beam is outside the optical element and 0.5-2.0 Rayleigh ranges away from the surface of the optical element. Also, an intensity of the femtosecond laser beam at the surface of the optical element is sufficient to ablate the surface.

17 Claims, 6 Drawing Sheets

(56) References Cited

U.S. PATENT DOCUMENTS

| | | | |
|---|---|---|---|
| 2002/0125230 A1* | 9/2002 | Haight | A61B 18/26 |
| | | | 219/121.69 |
| 2006/0285071 A1 | 12/2006 | Erickson et al. | |
| 2009/0059166 A1* | 3/2009 | Suzuki | B23K 26/18 |
| | | | 351/159.73 |

OTHER PUBLICATIONS

Chow et al., Experimental Study on the Effect of Varying Focal Offset Distance on Laser Micropolished Surfaces, International Journal of Advanced Manufacturing Technology 67:2607-2671, Dec. 2012 (Year: 2012).*

Jang et al., A method of laser micro-polishing for metallic surface using UV nano-second pulse and CW lasers, International Journal of Advanced Manufacturing Technology 85(9-12), Nov. 2014 (Year: 2014).*

Bustillo et al., Modelling of process parameters in laser polishing of steel components using ensembles of regression trees, International Journal of Computer Integrated Manufacturing 24(8):735-747, Aug. 2011. (Year: 2011).*

Taylor (Femtosecond laser polishing of optical materials, Proceedings vol. 9633, Optifab 2015; 96330M (2015)) (Year: 2015).*

\* cited by examiner

POLISHING OPTICAL ELEMENTS WITH A FEMTOSECOND LASER BEAM

CROSS-REFERENCE TO RELATED APPLICATION(S)

This application claims priority under 35 U.S.C. § 119(e) to U.S. Provisional Patent Application Ser. No. 62/435,038, "Femtosecond Laser Polishing," filed on Dec. 15, 2016. The subject matter of all of the foregoing is incorporated herein by reference in their entirety.

BACKGROUND

1. Technical Field

This disclosure relates generally to polishing optical elements using a femtosecond laser.

2. Description of Related Art

Optically rough surfaces on lenses and other optical elements impair their clarity and efficiency. Optical elements are polished to achieve an optically smooth finish. However, conventional laser machining and laser polishing techniques have difficulty in achieving smoothness of optical quality.

Femtosecond laser ablation has been used for removing material from a surface. Lasers have a desirable property of being effective on different starting levels of surface roughness. However, a surface treated with conventional femtosecond laser techniques still retains a certain level of roughness, no matter how many times the surface is treated. This roughness level typically does not meet the requirements of optical smoothness. Thus, conventional femtosecond laser techniques are not widely used for polishing surfaces to optical smoothness.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A system uses a femtosecond laser beam to polish a surface of an optical element to optical smoothness. The system includes a fixture, a laser system, and a controller controlling the fixture and laser system. The fixture holds the optical element so that the optical element can be positioned by the controller relative to the laser beam. The laser system generates the femtosecond laser beam. The femtosecond laser beam is a sequence of laser pulses that are converging as they propagate towards the optical element. In some instances, the laser pulses have a pulse duration of less than 900 femtoseconds (e.g., a pulse duration between 200 femtoseconds and 350 femtoseconds) and an energy between 2 µJ and 25 µJ.

The controller controls relative positioning of the surface of the optical element and the femtosecond laser beam. For example, the controller may move the fixture and optical element, move the laser beam, or both. The controller maintains the relative positioning such that a waist of the femtosecond laser beam is located outside the optical element and preferably is 0.5-2 Rayleigh ranges away from the surface. In addition, the intensity of the femtosecond laser beam at the surface is sufficient to ablate the surface via field ablation. In field ablation, the electric field in the laser pulse is strong enough to strip electrons from atoms in the material to be polished. It may be contrasted with thermal ablation in which there is enough time for the material to be heated. Preferably, the femtosecond laser beam is also perpendicular to the surface.

The controller scans the femtosecond laser beam over the surface. In some embodiments, the femtosecond laser beam has a diameter in a range from 1-10 µm on the surface. For example, the diameter of the femtosecond laser beam is in a range from 2-5 µm. The controller may scan the femtosecond laser beam over the surface multiple times and/or in a manner such that the consecutive laser pulses of the femtosecond laser beam partially overlap (e.g., by at least 50%) at the surface. After polishing, the surface is optically smooth. In some embodiments, optically smooth means surface roughness of about $\lambda/50$ or better, where $\lambda$ is the operating wavelength for the optical element being polished. At visible wavelengths, optically smooth typically means surface roughness of about 10 nm or better. By maintaining the waist away from the surface being polished, better results can be achieved than with conventional laser ablation where the maximum intensity waist is positioned directly at the surface, as will be explained in more detail below.

Figure 1:
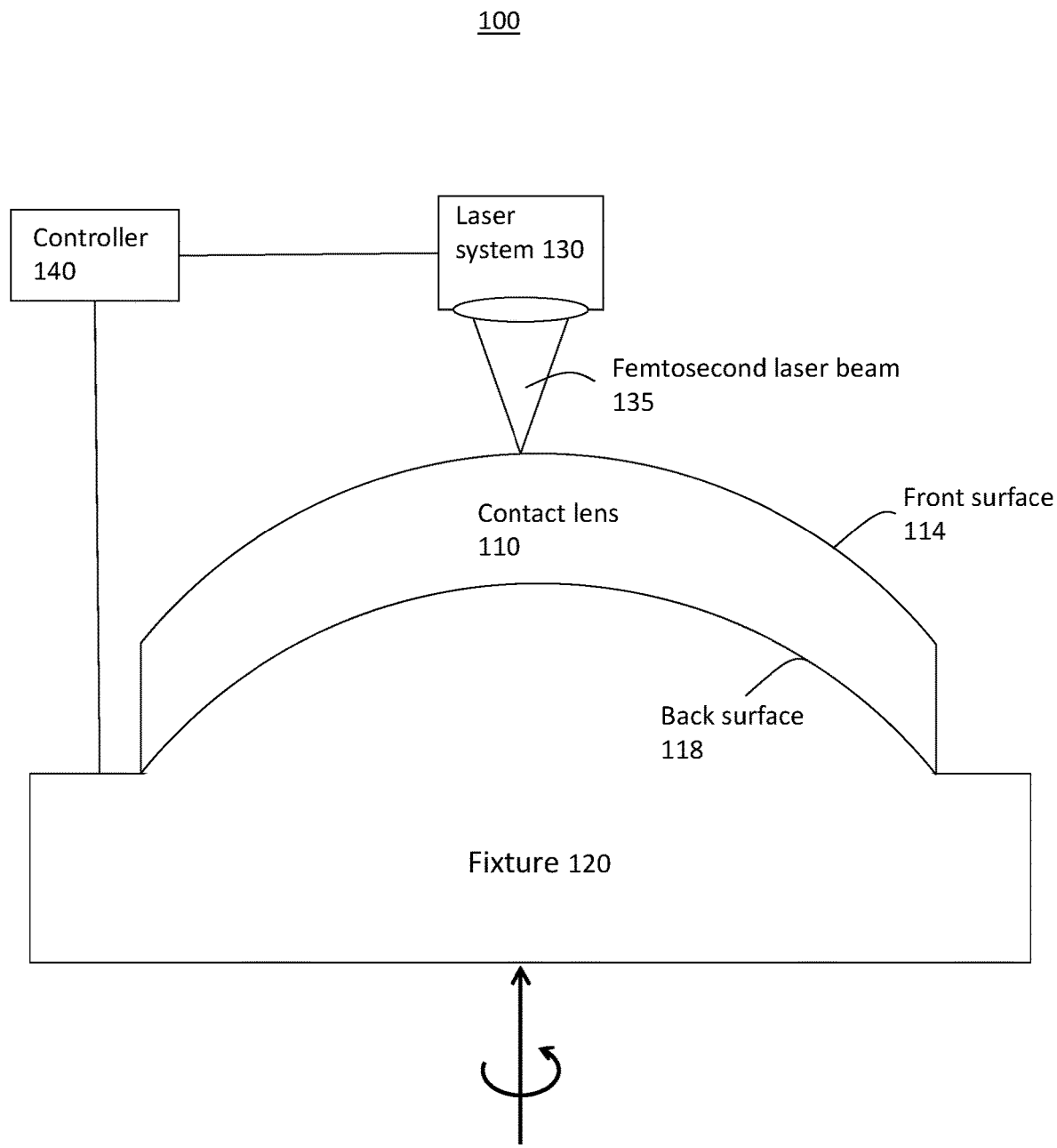
FIG. 1 is a schematic diagram of a system using a femtosecond laser beam to polish a surface of a contact lens to optical smoothness.

As a specific example, FIG. 1 is a schematic diagram of a system 100 using a femtosecond laser beam 135 to polish a surface 114 of a contact lens 110 to optical smoothness. The system 100 includes a fixture 120, a laser system 130, and a controller 140.

The fixture 120 holds the contact lens 110. The contact lens 110 can be a scleral contact lens or a hard contact lens. It is customized for a particular wearer's eyeball shape and refractive correction requirements. The contact lens has two surfaces: a front, convex surface 114 and a back, concave surface 118. The shape of the front surface 114 provides refractive correction for the wearer's nearsightedness, farsightedness and/or astigmatism. The shape of the back surface 118 is made to fit the wearer's eyeball. In FIG. 1, the back surface 118 of the contact lens 110 is blocked to the fixture 120 and the front surface 114 of the contact lens 110 is facing the laser system 130.

The contact lens 110 moves with the fixture 120 so that a position/orientation of the contact lens 110 can be changed by changing a position/orientation of the fixture 120. As shown in FIG. 1, the fixture 120 can rotate. Also, the fixture 120 may move laterally (left and right, and in and out of the paper) as well as toward and away from the laser beam, to change positions of the contact lens 110. Not all systems require so many degrees of motion. The fixture 120 and contact lens 110 are moved to facilitate polishing of different spots on the front surface 114 of the contact lens. Alternately, the fixture can be held stationary and the laser beam 135 moved.

The laser system 130 generates the femtosecond laser beam 135. The femtosecond laser beam 135 is a sequence of laser pulses that converge towards the front surface 114. The laser pulses have a pulse duration of less than 900 femtoseconds. In some instances, the pulse duration is between 250 femtoseconds and 450 femtoseconds (e.g., 350 femtoseconds). The laser pulses can have an adjustable pulse repetition rate that falls in a range from 1 kHz to 800 kHz. In some instances, the energy of the pulses is between 2 µJ and 25 µJ. The femtosecond laser beam 135 has sufficient field strength to ablate the front surface 114 but does not produce heat damage in the contact lens 110. Thus, the contact lens 110 is not overheated during the polishing process. In some embodiments, the femtosecond laser beam 135 is a Gaussian beam with a beam quality factor of 1.15 or lower (i.e., $M^2<1.15$). A wavelength of the femtosecond laser beam 135 may be between 0.9 µm and 1.1 µm (e.g., 1.03 µm). A waist of the femtosecond laser beam 135 may have a diameter of 2 µm. The femtosecond laser beam 135 can be circularly polarized. In one embodiment, the laser system 130 includes a laser machine manufactured by TRUMPF.

The controller 140 controls the fixture 120 and the laser system 130, including their relative positioning. As described previously, the controller 140 sets the relative positioning such that a waist of the femtosecond laser beam 135 is outside the contact lens 110 and 0.5-2.0 Rayleigh ranges way from the front surface 114. Preferably, the waist of the femtosecond laser beam 135 is approximately one Rayleigh range away from the front surface 114.

In addition, the intensity of the femtosecond laser beam 135 at the front surface 114 is sufficient to ablate the front surface. For example, the intensity of the femtosecond laser beam 135 at the front surface 114 is at least at a field ablation threshold of the material of the front surface 114. In one approach, the controller 140 empirically determines the intensity of the femtosecond laser 135 as follows. The controller 140 positions the waist of the femtosecond laser beam at the front surface 114 and scans the femtosecond laser beam over the front surface 114 in a manner that successive pulses do not overlap. The controller 140 increases the power of the femtosecond laser beam until ablation is observed. The controller 140 then backs the laser beam waist away from the front surface 114 by at least one Rayleigh range (say, 1.5-2 Rayleigh ranges) and doubles the power. Doubling the power will produce the same intensity at the front surface 114 when the waist is located one Rayleigh range away from the front surface 114, as was produced at the original power when the waist was located at the front surface 114. The controller 140 gradually moves the beam waist closer to the front surface 114 until ablation begins, which is when the waist is one Rayleigh range away from the front surface 114. The relative positioning of the front surface 114 and the femtosecond laser beam 135 also ensures that the intensity of the femtosecond laser beam is not too high to cause heating, self-focusing in the optical element or other unwanted effects present in conventional ablation techniques (e.g., sub-surface self-focusing and filament formation). In some instances, the intensity of the femtosecond laser beam 135 at the front surface 114 is at least two times lower than an intensity of the femtosecond laser beam 135 at its waist.

The controller 140 also scans the femtosecond laser beam 135 over the front surface 114 during polishing. This could be done by moving either the fixture 120 or the laser beam 135. The femtosecond laser beam 135 has a diameter of approximately 2-5 µm at the surface of the contact lens 110. The controller 140 may scan the femtosecond laser beam 135 over the front surface 114 of the contact lens 110 in a manner that consecutive laser pulses partially overlap at the front surface. Also, the controller 140 may scan the femtosecond laser beam 135 over the front surface 114 multiple times. For each scan, the femtosecond laser beam 135 is positioned slightly deeper into the contact lens 110 than it was in the previous scan. Preferably, the controller 140 also maintains the femtosecond laser beam 135 perpendicular to the curved front surface 114 during polishing. After polishing, the front surface 114 preferably has a surface roughness of $\lambda/50$ or better, which meets requirements of optical smoothness.

The controller 140 can reposition the fixture 120 and/or the laser beam 135 to have the femtosecond laser beam polish the back surface 118 of the contact lens 110 (although a different type of fixture would be used) in a similar manner.

In addition to polishing the two surfaces 114 and 118 of the contact lens 110, the system 100 can also be used in a conventional ablation mode to provide gross shaping of the contact lens 110 before polishing. Shaping and polishing the contact lens may proceed as separate operations. Shaping, or removing material in larger increments, may be used to establish an overall shape but with more surface roughness. Polishing is the process of removing small increments of material to leave an optically smooth surface. Conventional femtosecond laser ablation techniques may be used for shaping while femtosecond laser polishing techniques described herein are used to produce an optically smooth surface.

The system 100 can be applied to shape and/or polish other types of optical elements than contact lenses. For example, the system 100 is suitable for polishing or machining various types of dielectric materials, including polymer, glass, diamond, ceramic, metal oxide, and composite material.

Figure 2A:
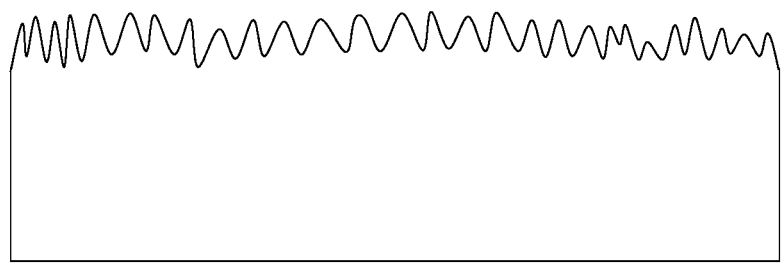
FIGS. 2A and 2B show a surface of an optical element before and after polishing, respectively.
Figure 2B:
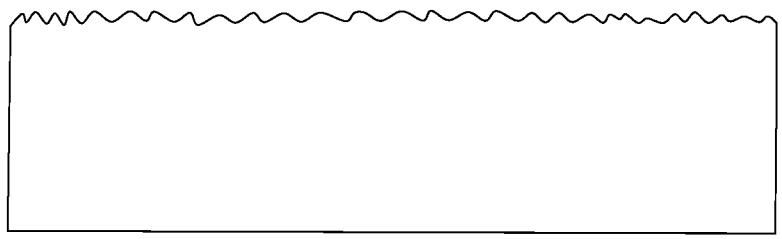

FIGS. 2A-2B show a surface of an optical element before (FIG. 2A) and after (FIG. 2B) polishing by the system of FIG. 1. In FIG. 2A, the surface 210 has a surface roughness of about one tenth the wavelength of visible light. The surface 210 has been shaped to the correct shape, but it is not optically smooth. In one embodiment, the surface roughness of the surface 210 is about 50 nm, which does not meet requirements of optical smoothness. Optical smoothness requires a surface roughness of about 0.5 nm to about 10 nm. The surface 210 therefore needs to be polished before it can be considered as an optical quality surface.

FIG. 2B shows a surface roughness of the surface 220 after polishing. The surface roughness is less than 10 nm and therefore meets the requirements of optical smoothness. The surface 220 after polishing can be considered as an optical quality surface.

Figure 3:
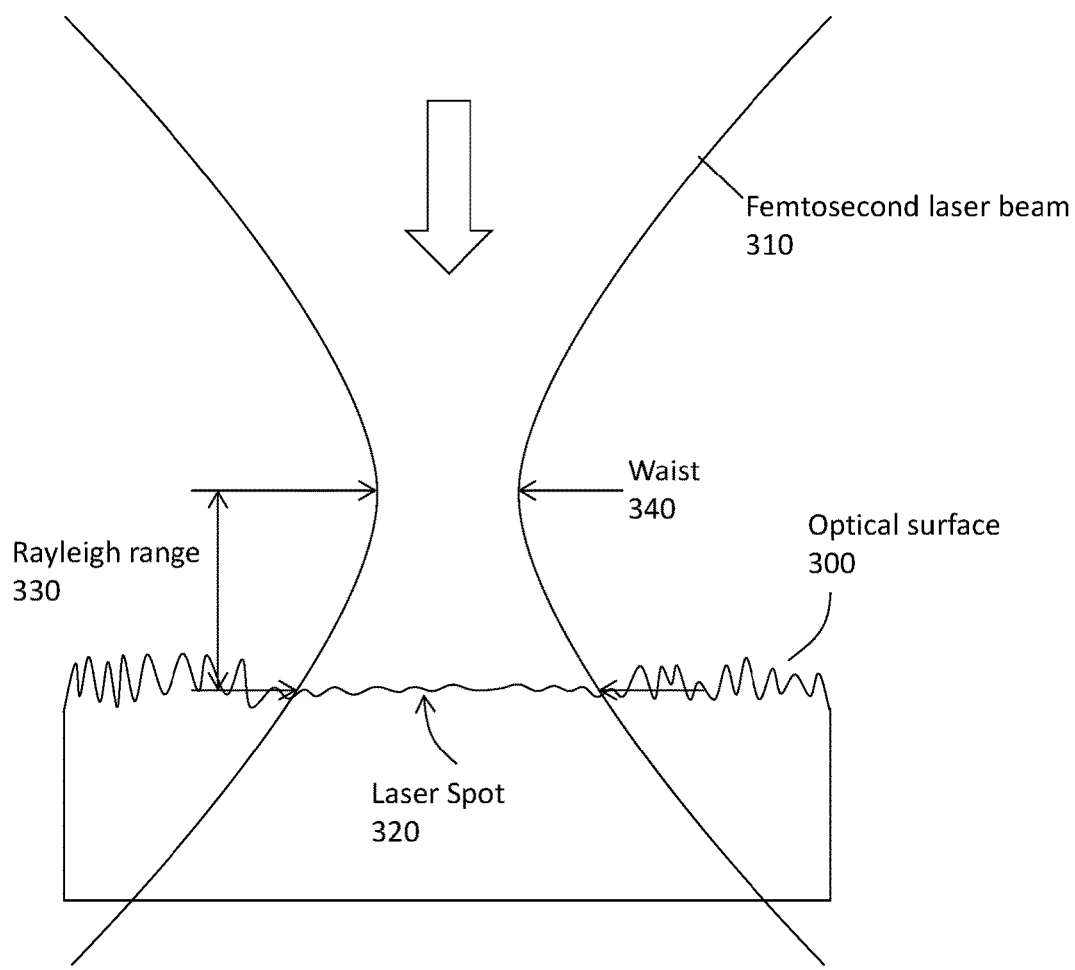
FIG. 3 shows a relative positioning of a surface of an optical element and a femtosecond laser beam polishing the surface.

FIG. 3 shows a relative position of a surface 300 of an optical element and a femtosecond laser beam 310 polishing the surface. In FIG. 3, the femtosecond laser beam 310 converges to its waist 340, then diverges to spot 320 at the surface 300 and then enters the optical element. The direction of propagation for the laser beam 310 is shown by the large arrow. In FIG. 3, the femtosecond laser beam 310 produces a spot 320 on the surface 300 being polished. The spot 320 has a diameter of approximately 2 µm. The femtosecond laser beam 310 has a waist 340 with a diameter of $2w_0$. The waist 340 is located approximately one Rayleigh range 330 away from the surface 300. The Rayleigh range for a Gaussian laser beam is given by $Z_R = \pi w_0^2/\lambda$, where $\lambda$ is the beam wavelength. The diameter of the femtosecond laser beam 310 at the surface 300 is $2\sqrt{2} w_0$, which is $\sqrt{2}$ times larger than its diameter at the waist 340. As a result, the intensity of the femtosecond laser beam 310 at spot 320 is two times lower than the intensity of the femtosecond laser beam 310 at the waist 340.

The peak intensity of the femtosecond laser beam 310 at the spot 320 should not be too high or too low. If the peak intensity is too high, ablation of the material may also occur deeper below the surface 300 than desired, causing more surface roughness. If the peak intensity is too low, the surface 300 will not be ablated. In FIG. 3, the peak intensity of the femtosecond laser beam 310 at the spot 320 is at the field ablation threshold of a material of the surface 300.

Figure 4:
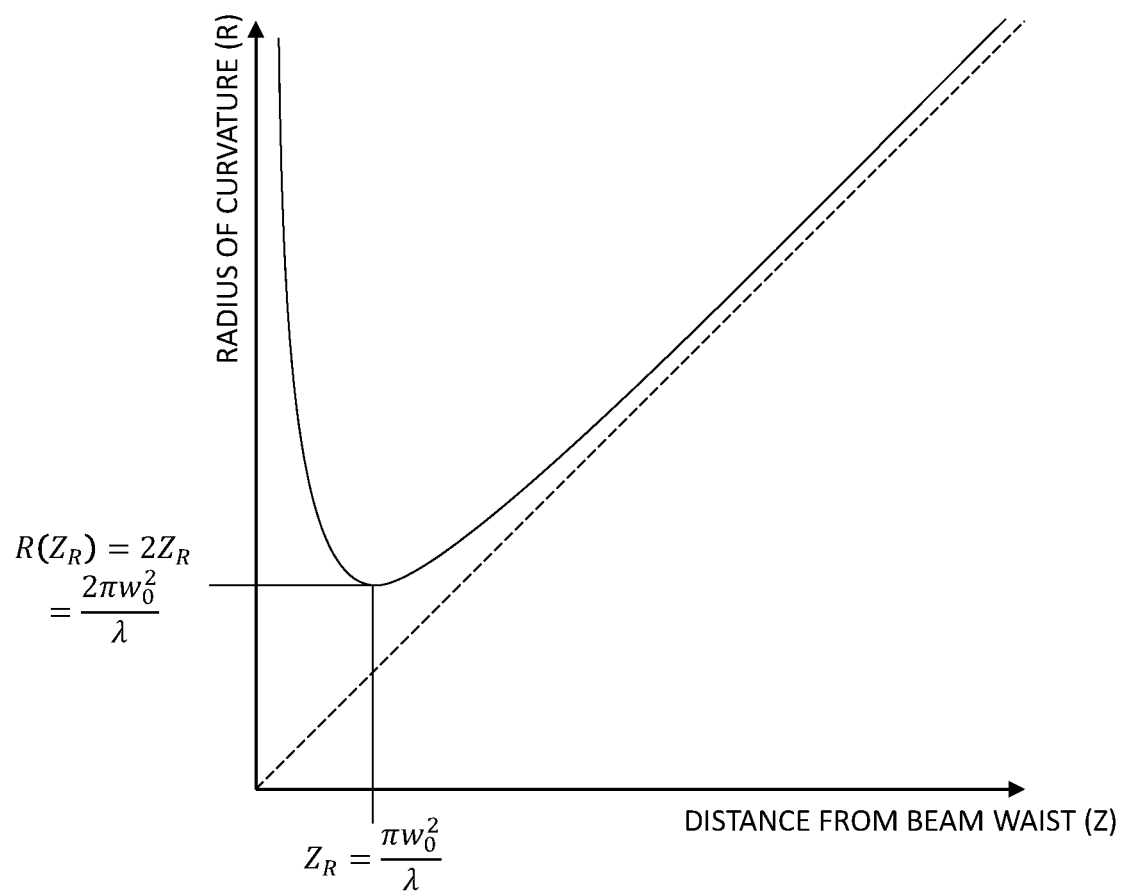
FIG. 4 is a plot showing a radius of curvature of a femtosecond laser beam as a function of a distance from a beam waist of the femtosecond laser beam.

FIG. 4 is a plot showing a radius of curvature R of a femtosecond laser beam as a function of a distance Z from a beam waist of the femtosecond laser beam. In FIG. 4, the femtosecond laser beam is a Gaussian laser beam. At the beam waist, the femtosecond laser beam has infinite radius of curvature, meaning wavefronts of the femtosecond laser beam are flat at the beam waist. The radius of curvature R(Z) reaches its minimum at one Rayleigh range, $Z_R$, away from the waist. That is, the wavefronts of the femtosecond laser beam are most highly curved at the Rayleigh range. In FIGS. 3 and 4, ablation occurs at a location of the laser beam where the beam is most highly diverging.

In a conventional ablation method, the beam waist of the femtosecond laser beam is located at the surface being ablated. Surface roughness can be thought of as a collection of small converging lenses. Because the wavefronts of the femtosecond laser beam are flat at the beam waist, the wavefronts are focused by the surface roughness of the surface into small hot spots that ablate the surface unevenly.

However, in the system 100 described in conjunction with FIG. 1, the waist of the femtosecond laser beam is approximately one Rayleigh range away from the surface being polished. Consequently, the most highly diverging wavefront is positioned at the surface. This mitigates the converging lens effects from surface roughness. The surface roughness of the surface, which functions a collection of converging lenses, produces fewer and less intense hot spots because the highly diverging wavefronts of the femtosecond laser beam are not as easily focused into hot spots. Thus, the system 100 as described in FIG. 1 allows the femtosecond laser beam 135 to polish the surface 114 to achieve optical smoothness.

Figure 5:
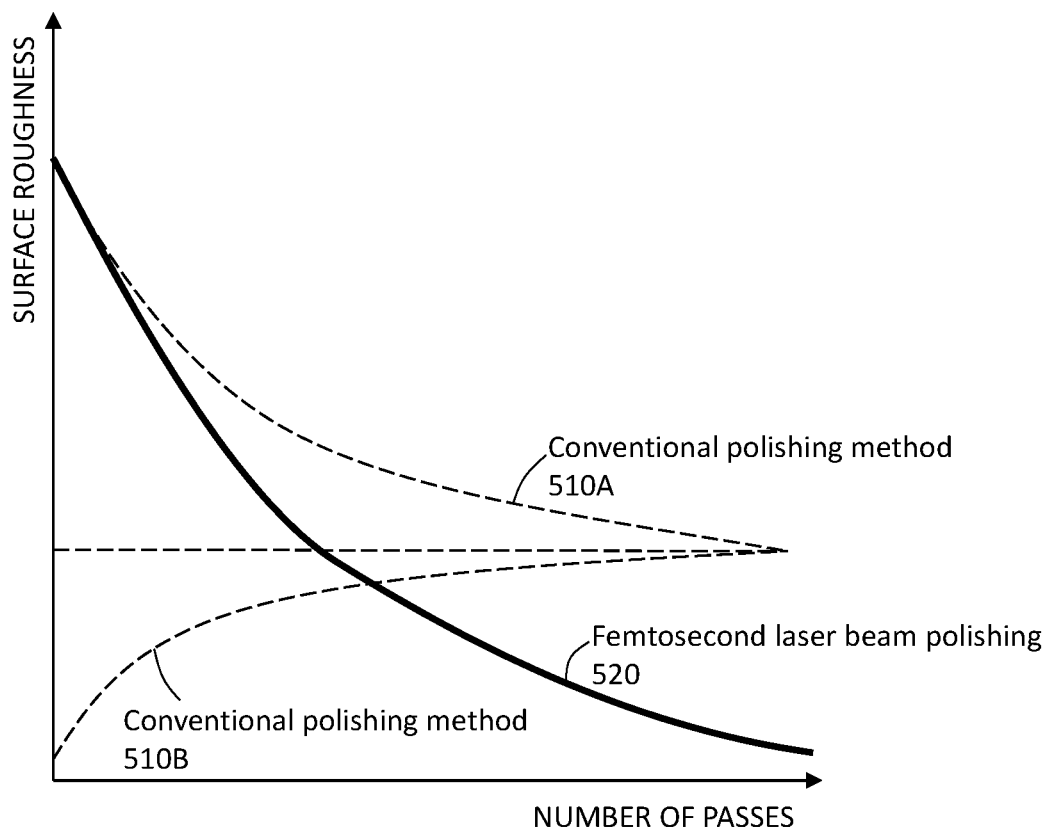
FIG. 5 is a graph illustrating differences between a conventional polishing method and the polishing method described in FIG. 1.

FIG. 5 is a graph illustrating differences between a conventional polishing method and the polishing method described above. FIG. 5 shows a plot of surface roughness as a function of number of passes. Using the conventional polishing method, femtosecond laser ablation leads to a level of surface roughness that is not optically smooth. The surface roughness depends on the number of passes the femtosecond laser beam over the surface, laser pulse length, laser depth of focus, optical properties of the surface, and other factors. The ultimate roughness, achieved after multiple scans of the femtosecond laser beam over the surface, is the same regardless of whether the initial surface was quite rough as shown by curved dashed line 510A or very smooth as shown by curved dashed line 510B.

The level of surface smoothness that can be achieved is limited by the underlying ablation mechanism. As discussed above, with the conventional polishing method, surface roughness affects beam focusing and therefore the surface roughness cannot be reduced once it reaches a certain level. Surface roughness produces more surface roughness because it focuses the laser beam into small hot spots or places where the beam is more tightly focused and therefore causes uneven surface ablation.

With the polishing method described above, focusing of the femtosecond laser beam due to surface roughness is reduced and therefore, results in a smoother surface, as shown by curve 520 in FIG. 5.

Figure 6:
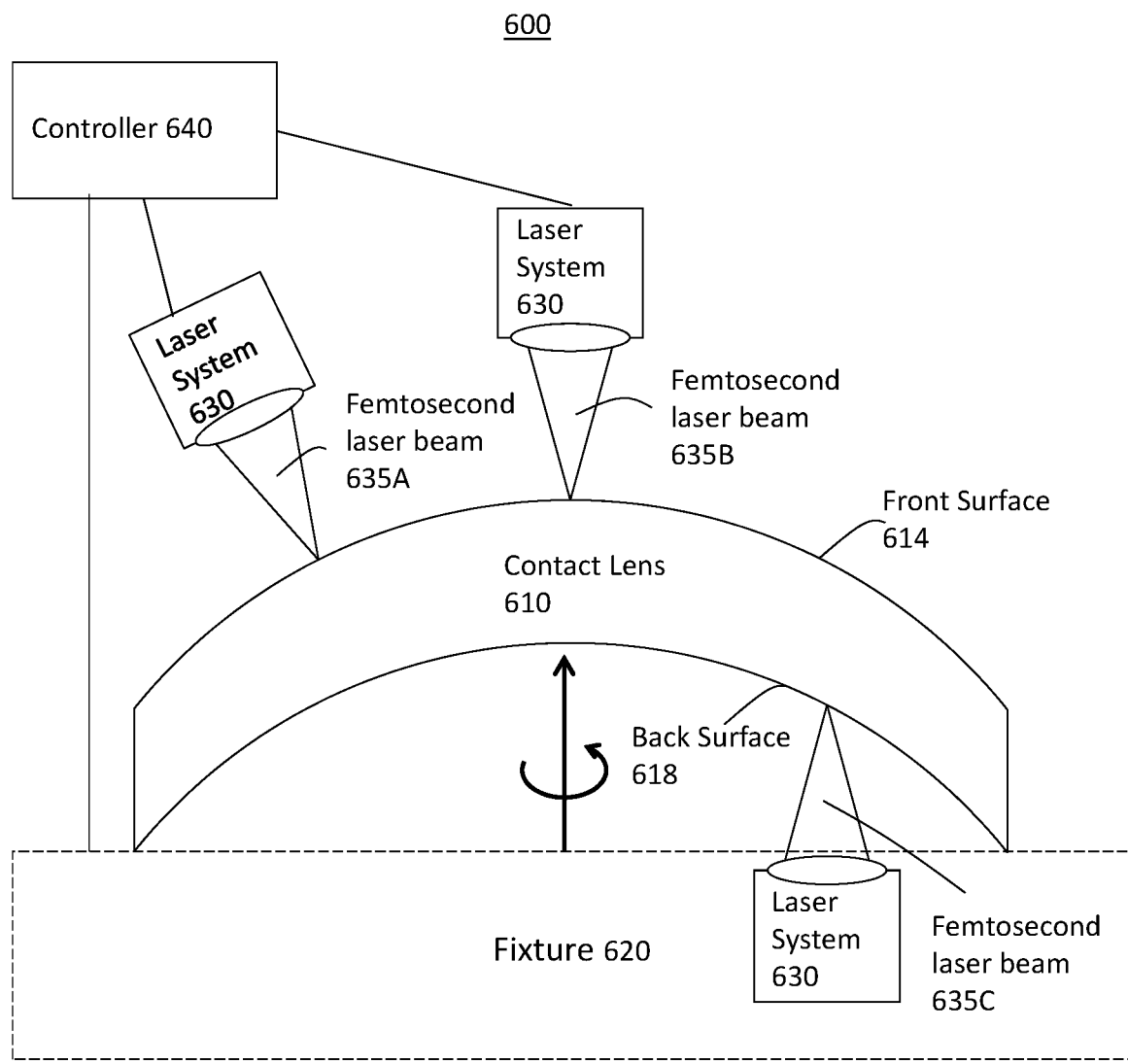
FIG. 6 is a schematic diagram of a system using multiple femtosecond laser beams to polish two surfaces of a contact lens to optical smoothness.

FIG. 6 is a schematic diagram of a system 600 using multiple femtosecond laser beams 635A-C in parallel to polish front and back surfaces 614 and 618 of a contact lens 610 to optical smoothness. Each of the femtosecond laser beams 635A-C produces converging laser pulses with a pulse duration of less than 900 femtoseconds. In FIG. 6, the femtosecond laser beams 635A-B polish the front surface 614 of the contact lens 610 and the femtosecond laser beam 635C polishes the back surface 618 of the contact lens 610. The system 100 includes a fixture 620, a laser system 630, and a controller 640.

The fixture 620 holds the contact lens 610, but in a manner that allows laser access to both the front and back surfaces. The contact lens 610 has two surfaces: a front, convex surface 614 and a back, concave surface 618. The laser system 630 generates the three femtosecond laser beams 635A-C. The laser system 630 may be three separate lasers, as shown in FIG. 6. Alternatively, it may be a single laser that initially generates one laser beam, which is then optically split into three laser beams 635A-C. The femtosecond laser beams 635A-C may be the same or different, for example if the front and back surfaces require different laser parameters for ablation. In FIG. 6, the laser beams 635A-C operate simultaneously, but they may also be used sequentially.

The controller 640 controls the fixture 620, the laser system 630 and the laser beams 635A-C. The controller 640 controls relative positioning of each laser beam 635 relative to the surface 114, 118 it is treating. That is, the waist of each femtosecond laser beam 635A-C is outside the contact lens 610 and 0.5-2.0 Rayleigh ranges way from the respective surface 114, 118. The controller 640 also controls power and scanning of the laser beams 635A-C. The techniques described above for a single laser beam may also be applied to the multiple laser beam system shown in FIG. 6. After polishing, the front surface 614 and the back surface 618 each has a surface roughness of 10 nm or better, which meets requirements of optical smoothness.

Although the detailed description contains many specifics, these should not be construed as limiting the scope of the invention but merely as illustrating different examples. It should be appreciated that the scope of the disclosure includes other embodiments not discussed in detail above. For example, longer pulses can be used to induce thermal smoothing effect. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A system for polishing a surface of an optical element to optical smoothness, the system comprising:
    a fixture that holds the optical element, wherein an operational wavelength for the optical element is a visible wavelength;
    a laser system that generates a femtosecond laser beam comprising converging laser pulses with a pulse duration less than 900 femtoseconds and a wavelength between 0.9 µm and 1.1 µm; and
    a controller configured to control relative positioning of a surface of the optical element and the femtosecond laser beam, such that a waist of the femtosecond laser beam is outside the optical element and 0.5-2.0 Rayleigh ranges away from the surface, the femtosecond laser beam has a diameter of approximately 2-5 µm at the surface of the optical element, and an intensity of the femtosecond laser beam at the surface of the optical element is sufficient to ablate the surface, and the controller further configured to scan the femtosecond laser beam over the surface to polish the surface to an optical smoothness without producing heat damage in the optical element.

2. The system of claim 1, wherein the controller is configured to scan the femtosecond laser beam over the surface to polish the surface to an optical smoothness.

3. The system of claim 2, wherein the controller is configured to scan the femtosecond laser beam over the surface to polish the surface to a surface roughness of $\lambda/50$ or better, where $\lambda$ is an operational wavelength for the optical element.

4. The system of claim 1, wherein the controller is further configured to control the laser system to produce a second femtosecond laser beam with higher intensity at the surface of the optical element for shaping the optical element before polishing the surface.

5. The system of claim 1, wherein the femtosecond laser beam has a beam quality factor of 1.15 or smaller.

6. The system of claim 1, wherein the intensity of the femtosecond laser beam at the surface of the optical element is at least two times lower than an intensity of the femtosecond laser beam at its waist.

7. The system of claim 1, wherein the pulse duration is between 250 femtoseconds and 450 femtoseconds.

8. The system of claim 1, wherein the laser pulses have an energy between 2 µJ and 25 µJ.

9. The system of claim 1, wherein the system is suitable for polishing a contact lens.

10. The system of claim 1, wherein the system is suitable for polishing at least one of the following dielectric materials: polymer, glass, diamond, ceramic, metal oxide, and composite material.

11. The system of claim 1, wherein the controller is configured to scan the femtosecond laser beam over the surface in a manner that consecutive laser pulses partially overlap at the surface of the optical element.

12. The system of claim 1, wherein the controller is configured to scan the femtosecond laser beam over the surface multiple times, with the femtosecond laser beam positioned deeper into the optical element with each scan.

13. The system of claim 1, wherein the surface is curved and the controller is configured to maintain the femtosecond laser beam as perpendicular to the surface.

14. The system of claim 1, wherein the controller is configured to further reposition and then control relative positioning of a second surface of the optical element and the femtosecond laser beam, such that a waist of the femtosecond laser beam is outside the optical element and 0.5-2.0 Rayleigh ranges away from the second surface, and an intensity of the femtosecond laser beam at the second surface of the optical element is sufficient to ablate the second surface.

15. The system of claim 14, wherein the surface and the second surface are a front surface and a back surface of the optical element.

16. The system of claim 1, wherein:
    the laser system generates a plurality of femtosecond laser beams, each femtosecond laser beam comprising converging laser pulses with a pulse duration less than 900 femtoseconds; and
    the controller is configured to control relative positioning of one or more surfaces of the optical element and each of the femtosecond laser beams, such that the waists of the femtosecond laser beams are outside the optical element and 0.5-2.0 Rayleigh ranges away from the corresponding surface, and the intensities of the femtosecond laser beams at the corresponding surface of the optical element are sufficient to ablate the surface.

17. The system of claim 16, wherein at least one of the femtosecond laser beams polishes a front surface of the optical element and another of the femtosecond laser beams polishes a back surface of the optical element.

* * * * *